US 6,541,097 B2

(12) United States Patent
Lynch et al.

(10) Patent No.: US 6,541,097 B2
(45) Date of Patent: Apr. 1, 2003

(54) RIBBED BOARD (75) Inventors: Steven K. Lynch, St. Charles, IL (US);
Bei-Hong Liang, Naperville, IL (US);
Frederick Frein, Somerville, MA (US);
Karine A. Luetgert, Geneva, IL (US);
Dennis J. Farrell, Collierville, TN (US)

(73) Assignee: Masonite Corporation, Tampa, FL (US)

( * ) Notice: Subject to any disclaimer, the term of this patent is extended or adjusted under 35 U.S.C. 154(b) by 0 days.

(21) Appl. No.: 09/833,128

(22) Filed: Apr. 11, 2001

(65) Prior Publication Data

US 2001/0030016 A1 Oct. 18, 2001

Related U.S. Application Data

(63) Continuation-in-part of application No. 09/439,136, filed on Nov. 12, 1999, now Pat. No. 6,364,982.

(51) Int. Cl.[7] .............................................. B29D 16/00
(52) U.S. Cl. ...................... 428/156; 428/163; 428/170; 428/184; 156/205; 156/296; 264/109; 108/51.11; 108/57.28; 108/57.29
(58) Field of Search ................................ 156/62.2, 196, 156/205, 219, 296, 580; 264/109; 428/170, 174, 182, 156, 163, 184; 108/51.11, 57.28, 57.29

(56) References Cited

U.S. PATENT DOCUMENTS

| | | | |
|---|---|---|---|
| 3,861,326 A | 1/1975 | Brown | 108/51 |
| 4,061,813 A | 12/1977 | Geimer et al. | 428/183 |
| 4,514,532 A | 4/1985 | Hsu et al. | 524/14 |
| 4,828,642 A | 5/1989 | Newman et al. | 156/328 |
| 4,904,517 A | 2/1990 | Lau et al. | 428/167 |
| 5,290,621 A | 3/1994 | Bach et al. | 428/176 |
| 5,440,998 A | 8/1995 | Morgan, IV et al. | 108/51.1 |
| 5,829,363 A * | 11/1998 | Reilly | 108/55.1 |
| 5,900,304 A | 5/1999 | Owens | 428/182 |

FOREIGN PATENT DOCUMENTS

EP     0 049 299     4/1982

OTHER PUBLICATIONS

Written Opinion dated Jul. 24, 2000 for International Application No.PCT/US99/26633.

* cited by examiner

Primary Examiner—Sam Chuan Yao
(74) Attorney, Agent, or Firm—Liniak, Berenato & White, LLC (57) ABSTRACT

A method for the production of ribbed board product, such as fiberboard, flakeboard, or waferboard, which resists fracturing during manufacture. The ribbed board product made according to the invention can be used as decking and in packaging and shipping components.

2 Claims, 5 Drawing Sheets

RIBBED BOARD

This application is a continuation in-part of U.S. patent application Ser. No. 09/439,136 filed Nov. 12, 1999, now U.S. Pat. No. 6,364,982, the entire disclosure of which is incorporated herein.

BACKGROUND OF THE INVENTION

1. Field of the Invention

This invention relates generally to composite articles. More specifically, the invention relates to a method of producing molded board products useful for packaging components.

2. Description of Related Technology

Many types of wood composites exist, including, for example: fiberboards such as hardboard, medium density fiberboard, and softboard; chipboards such as particleboard, waferboard; and oriented strandboard. Boards made of combinations of these materials are also useful.

Many different methods of manufacturing these wood composites such as fiberboard are known in the art, for example as disclosed in U.S. Pat. No. 4,514,532 (Apr. 30, 1985) to Hsu et al. and U.S. Pat. No. 4,828,643 (May 9, 1989) to Newman et al. The disclosures of these patents are incorporated herein by reference. The principal processes for the manufacture of fiberboard include (a) wet felted/wet pressed or "wet" processes, (b) dry felted/dry pressed or "dry" processes, and (c) wet felted/dry pressed or "wet-dry" processes. Synthetic resins, such as phenol-formaldehyde ("PF") resins or modified PF resins, are often used as binders in these processes.

Generally, in a wet process, cellulosic fibers (e.g., woody chip material subjected to fiberization in a pressurized refiner to form wood fibers) are blended in a vessel with large amounts of water to form a slurry. The slurry preferably has sufficient water content to suspend a majority of the wood fibers and preferably has a water content of at least 95 percent by weight ("weight percent"). The water is used to distribute a synthetic resin binder, such as a phenol-formaldehyde resin over the wood fibers. This mixture is deposited onto a water-previous support member, such as a fine screen or a Fourdrinier wire, and precompressed, whereby much of the water is removed to leave a wet mat of cellulosic material having, for example, a moisture content of about fifty percent, based on the weight of dry cellulosic material. The wet mat is transferred to a press and consolidated under heat and pressure to form the molded wood composite.

A wet-dry forming process can also be used to produce wood composites. Preferably, a wet-dry process begins by blending cellulosic material (e.g., wood fiber) in a vessel with a large amount of water. This slurry is then blended with a resin binder. The blend is then deposited onto a water-pervious support member, where a large percentage (e.g., 50 weight percent or more) of the water is removed, thereby leaving a wet mat of cellulosic material having a water content of about 40 wt. % to about 60 wt. %, for example. This wet mat is then transferred to a zone where much of the remaining water is removed by evaporation by heat to form a dried mat. The dried mat preferably has a moisture content of about 10 wt. % or less. The dried mat is then transferred to a press and consolidated under heat and pressure to form a wood composite which may be a flat board or a molded product, for example. The product can be molded into various shapes or geometries depending on the intended use.

In a dry process, the wood fibers are generally conveyed in an airstream or by mechanical means, rather than by a liquid stream. Wood fibers supplied from a fiberizing apparatus are blended with a thermosetting resin binder, such as a phenol-formaldehyde resin, and a sizing agent such as wax. The fibers with an addition of resin (3–10%) and wax can be dried and then be randomly formed into a mat (felted) by air blowing the fibers onto a support member. The mat, typically having a moisture content of about 5–8 wt. % based on the weight of dry fibers, is then pressed under heat and pressure to cure the thermosetting resin and to compress the mat into an integral consolidated structure. This mat can be pressed into various shapes varying from flat panel to three-dimensional using machined die sets.

When pressing mats into a ribbed configuration, however, various problems may arise. When creating ribbed high density fiberboard, fracturing of the board can occur at the flats of the ribbed configuration, reducing the strength and handleability of the product. Other problems may include a soft surface, lack of consolidation, brittleness, blistering, and warping in the final product.

It would therefore be desirable to be able to manufacture a ribbed high density fiberboard that does not fracture during manufacturing.

The present application is also directed to the production of packaging components such as pallets. Pallets are currently made from a variety of different materials such as wood, plywood, wood composites, plastic, corrugated cardboard, and metal. These materials each have their own distinct advantages and disadvantages. Solid wood remains the most common material used in pallets because of its low cost and high strength and stiffness. Wood, however, has inconsistent composition, is heavy when wet, and requires a great deal of labor when assembling into pallets.

Plywood pallets are known for their long life expectancy of seven to eight years. In addition, plywood pallets are easy to repair. However, plywood can be heavy. Furthermore, it may be more expensive, because it must be cut from a four foot by eight foot panels, which causes a lower yield per panel.

Plastic pallets, including those made of high density polyethylene, have also been used. However, they can be four times more expensive than wood pallets. Advantages of plastic pallets are moldability and cleanability. Sag resistance, fire threats, and difficult repairability are known limiting factors.

Metal pallets are used by the smallest segment of the industry. They are very expensive, but they can hold large loads and they are virtually indestructible.

Wood/plastic composite pallets, such as those available from Dura Products International of Toronto, Ontario and Litco International Inc. of Vienna, Ohio can be made from sawdust shavings and waste plastic bottles. Wood composite pallets are lighter than wood, fully recyclable, economically competitive, and have consistent dimensions. The weaknesses of composite pallet products include rackability, which is limited to 2800 pounds. Further, if some types of wood/plastic composite products are exposed to fire, they can emit toxic fumes.

Corrugated cardboard pallets are single-use items, and are limited to a 500 to 2,800 pound weight limit. The advantages of corrugated material include recyclability and design flexibility. These pallets are safe for the worker to handle, are easy to dispose of, produce no splinters, use no nails, have product uniformity free of mold spores, and are one-third the weight of wood. However, corrugated pallets are more easily damaged than wood, difficult to use on conveyor systems, weight restricted, and will degrade in the presence of water. Corrugated pallets can be wax coated so as to delay water damage. However, when such products are wax coated, they become more expensive and difficult to recycle.

It would therefore be desirable to manufacture a pallet that retains the beneficial properties of corrugated pallets while increasing its water resistance and strength attributes.

SUMMARY OF THE INVENTION

It is an object of the invention to overcome at least one of the problems described above.

According to the invention, a mat including material such as wood-based materials, agricultural fibers, and synthetic fibers and a binder resin is provided in a die configured to produce a ribbed composite board having contiguous outer zones and angled zones. The die is configured to produce a caliper difference between the outer zones and the angled zones, preferably wherein the outer zones have a caliper less than the angled zones.

According to an embodiment of the invention a component, such as a deck or strips, incorporates the ribbed composite board of the invention.

Other objects and advantages of the invention will become apparent to those skilled in the art from the following detailed description, taken in conjunction with the drawings and the appended claims.

DETAILED DESCRIPTION OF THE INVENTION

According to the present invention, a method is provided for producing a ribbed composite product from a mat including materials such as wood-based materials, agricultural fibers, and synthetic fibers. The wood-based materials may include fibers, flakes, and/or wafers. (For the purposes of this disclosure, the terms "flake" and "flakeboard" can be used interchangeably with "wafer" and "waferboard.") In addition, the mat may include fillers to achieve various desired properties. According to this method, the mat is consolidated under heat and pressure in an apparatus configured to produce a ribbed composite board material, such as fiberboard, flakeboard, or waferboard. Upon pressing, the board retains integrity and does not fracture. The ribbed molded composite products of the invention further have increased stiffness and handleability in the ribbed direction over corresponding panel products. The advantageous properties of the inventive product allow it to be an excellent component in applications such as decking, strips, slip sheets, inserts for corrugated boxes, and outside protective packaging.

An example of producing a preferred ribbed high density fiberboard product is described below. However, it is to be understood that the invention is also applicable to the production of other ribbed wood composite products, including flakeboards, waferboard, oriented strandboard, or fiberboards, for example. A preferred ribbed product of the invention is made from a raw material obtained by breaking down logs or other source of wood into chips. The chips are then refined in thermo-mechanical refiners that break down the chips into relatively uniform fibers by using steam and mechanical action. (Wood flakes, used in the inventive flakeboard product, are produced through mechanical slicing and flaking.) The source of fiber for the inventive wood composite product is preferably mixed hardwood or softwood species, but the raw material may also be agricultural based fibers (such as straw fiber, kenaf fiber, and hemp fiber) or synthetic fibers. The fibers used depend upon availability, cost, and special use requirements. Various methods of producing these fibers are known in the art.

The ribbed high density fiberboard of the invention is preferably formed using a dry felted process. Dry felted processes are disclosed in "Fiberboard Manufacturing Practices in the United States" by Otto Suchsland et al., U.S. Department of Agriculture, 1986, the disclosure of which is hereby incorporated herein by reference. In the dry process of the invention, the wood fibers are preferably conveyed in an airstream or by mechanical means, rather than by a liquid stream. However, the inventive method may also use a wet or a wet-dry process known in the art. Wood fibers supplied from a fiberizing apparatus can be added with a thermosetting resin binder in a mixing procedure with blow line or blender processes.

Phenol-formaldehyde ("PF") and melamine-urea-formaldehyde ("MUF") resins are preferred, but other resins known in the art, such as isocyanate resins, may be used. As an example, PF resin may be added at about 1% to about 8%, more preferably about 3.5% to about 4.5%, based on the weight of the dry fibers. Wax, such as an emulsified wax, preferably is added to the wood fibers to improve water resistance of the final product, preferably at a rate of about 1.0% to about 2.5%, based on the weight of the dry fibers. A tempering oil may also be applied to the face of the final product to improve surface hardness, machineability, and water resistance of the final product.

The resin-blended fibers preferably are dried and then randomly formed into a continuous mat by air blowing the fibers onto a support member. The continuous mat, typically having a moisture content of about 5% to about 10% based on the weight of dry fibers with a preferred moisture content of about 5.5% to 7% based on the weight of dry fibers, is then consolidated under heat and pressure to cure the thermosetting resin and to compress the mat into a consolidated product or integral structure.

As will be apparent to those of skill in the art, desirable pressing temperatures and pressures may be modified according to various factors, including the following: the thickness of the board, the type of fiber or flakes being pressed, the moisture content of the raw material, the press time, and the type of resin that is utilized. The moisture content of the wood-based materials and/or agricultural fibers (known as "furnish moisture content") is one important factor which controls the core temperature of the mat that can be achieved under given press conditions and therefore may control the press cycle. Press time can be decreased by increasing press temperature.

According to the present invention, the mat is placed in a die set with a preferred design according to the invention. The die set has a configuration, described in greater detail below, that allows for the production of a ribbed article, preferably having both (a) multiple generally planar longitudinally extending outer zones (sometimes referred to as flat zones or raised zones) and (b) multiple longitudinally extending inner zones (sometimes referred to as angled zones or sloped zones) that are disposed between and contiguous with the outer zones. These configurations will be described in more detail in conjunction with the drawings.

Figure 1A:
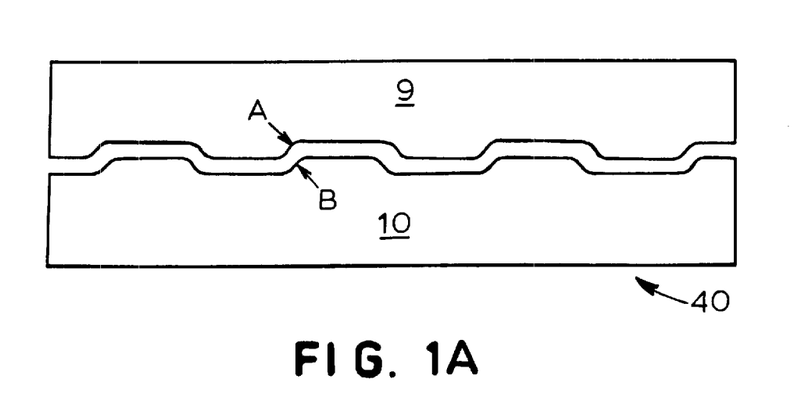
FIG. 1(a) is a cross-sectional view of a die set used according to the invention.

Referring initially to FIG. 1(a), the substrate caliper of a final board product will be defined by the distance or gap formed during pressing of a mat between a first die 9 and a second die 10. (The die set is referred to generally as element 40.) For example, a substrate caliper at one point of a product produced by the die set 40 will be defined by the distance or gap between point A and point B in FIG. 1(a) when the die set 40 is closed during consolidation. As described in detail below, the product produced by the die set 40 preferably will have a caliper and density that differs in at least two locations in the product.

Figure 1B:
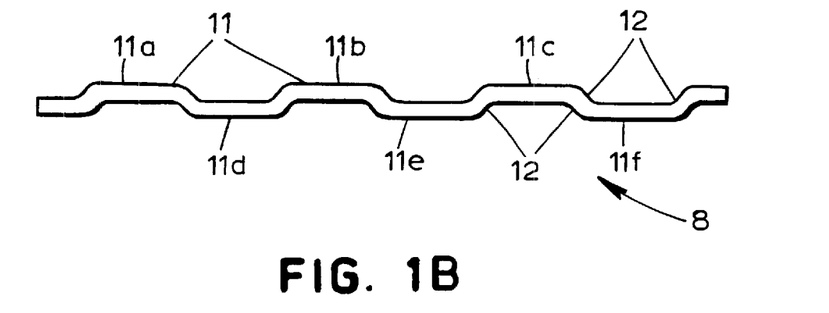
FIG. 1(b) is a cross-sectional view of a ribbed board product produced according to the invention.
Figure 4:
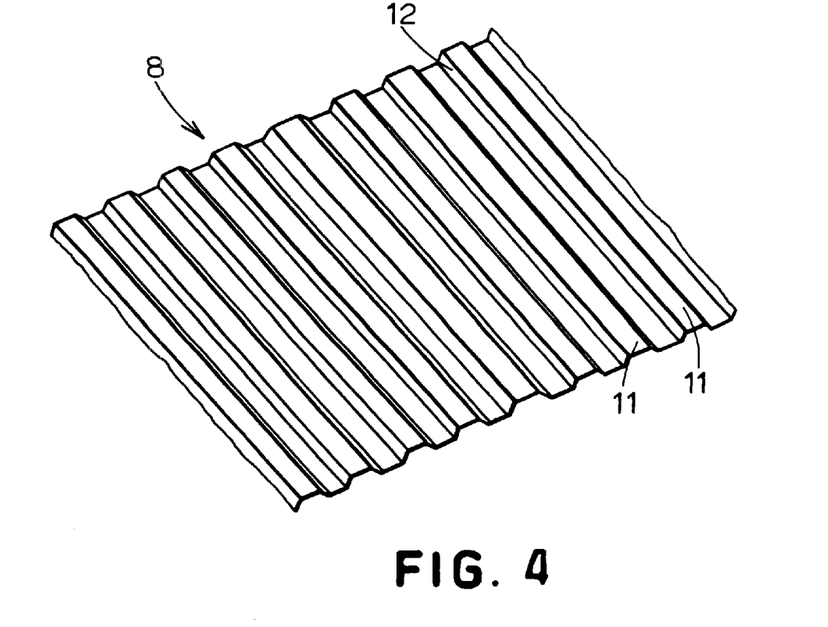
FIG. 4 is a perspective view of a ribbed board product produced according to the invention.

A product 8 of the invention produced by the die set 40 of FIG. 1(a) is exemplified in FIG. 1(b) and FIG. 4. The product 8 shown in FIG. 1(b) has (a) multiple generally planar longitudinally extending outer zones 11 and (b) multiple longitudinally extending inner or angled zones 12 that are disposed between and contiguous with the outer zones 11. The outer zones 11 may be disposed either upwardly of (e.g., elements 11a, 11b, 11c in FIG. 1(b)) or downwardly of (e.g., elements 11d, 11e, 11f) and contiguous with the angled zones 12. Adjacent outer zones (e.g., zones 11a and 11d) are spaced apart laterally a predetermined distance and vertically a predetermined distance. The outer zones 11a, 11b, 11c disposed upwardly (as shown in FIG. 1(b)) from the angled zones 12 may have a width either equal to or different from the width of the outer zones 11d, 11e, 11f disposed downwardly from the angled zones 12. While the outer zones 11 shown in FIG. 1b) are generally flat (planar), in some cases the outer zones 11 may have contours. For example, a subtle texture or other contour may be added to the outer zones of the product, to provide improved surface friction. Therefore, the use of the term flat herein refers to a generally planar portion. An outer zone 11 may also be formed by the peak of a curved portion of the product 8. For example, a product may have a cross section in the shape of a sinusoidal curve.

The angled zones 12 can form various angles with the outer zones 11. These draft angles may vary from about zero degrees to about 90 degrees, and preferably between about 30 degrees and about 90 degrees.

As the result of differing die gaps, the die set 40 of the invention preferably will produce a product 8 having a density and caliper that vary from one point to another. In general, the caliper of the outer zones 11 will be less than (thinner than) the caliper of the product 8 at the angled zones 12. (The caliper of the outer zones 11a, 11b, 11c may be different than the caliper of the outer zones 11d, 11e, 11f.) The differing caliper will provide substantial and unexpected advantages in production and use of the board product 8.

The caliper of the board 8, for example the distance between point A and point B in FIG. 1(b), generally may vary between about 0.085 inch to about 0.5 inch (about 2.16 mm to about 12.7 mm). The caliper of the angled zones 12 preferably differs (e.g., is greater than) from that of the outer zones 11. In fact, the ratio of the caliper of the outer zone to the caliper of the angled zone is less than 1.0, and preferably less than 0.9. For example, the caliper of the angled zones 12 is preferably in a range of about 0.115 inch to about 0.140 inch (about 2.92 mm to about 3.56 mm), with about 0.125 inches to about 0.130 inches (about 3.18 mm to about 3.30 mm) being preferred. The caliper of the outer zones 11 preferably is in a range of 0.09 inch to 0.115 inches (about 2.29 mm to about 2.93 mm) with a caliper of about 0.10 inch to about 0.115 inch (about 2.54 mm to about 2.92 mm) being preferred.

The molded rib product according to the invention preferably has an overall specific gravity of 0.65 to 1.10. A molded rib hardboard product preferably has an overall specific gravity of about 0.80 or greater, and more preferably is in a range of about 0.85 to about 1.10, depending upon the end use of the product, making the product a high density wood composite. The inventive flakeboard molded rib product preferably has an overall specific gravity of about 0.50 or greater, and more preferably in a range of about 0.60 to about 0.90. The invention may produce a fiberboard with a density of at least about 45 lb/ft$^3$, for example in a range of about 45 lb/ft$^3$ to about 60 lb/ft$^3$ (about 0.73 g/cm$^3$ to about 0.96 g/cm$^3$).

According to the invention, the outer zone 11 of a fiberboard article preferably will have a specific gravity of about 0.95 to about 1.10, more preferably about 0.95 to about1.05, with about 0.98 to about 1.02 being most preferred. The angled zone 12 in a fiberboard article preferably will have a specific gravity of about 0.85 to about 0.95, more preferably about 0.87 to about 0.93.

According to the invention, the outer zone 11 of a waferboard or flakeboard article preferably will have a specific gravity of about 0.75 to about 0.85, while the angled zone 12 preferably will have a specific gravity of about 0.65 to about 0.75.

The profile thickness of the product (measured by the greatest depth of the product, for example, the distance from a top surface of zone 11a to a bottom surface of zone 11d) can be in a range of about 0.25 inches to about 1.5 inches (about 6.35 mm to about 38.1 mm), with about 0.350 inches to about 0.750 inches (about 8.89 mm to about 19.05 mm) being most preferred.

The depth of draw in the final product 8 may also be an important parameter for some applications. The depth of draw, the distance between the outer zones, can be expressed as the distance traveled by an angled zone 12 between adjacent outer zones (e.g., the zones 11a and 11d). While the depth of draw may be uniform throughout a ribbed product 8, this need not be the case. Thus, the top surfaces of the outer zones 11 are optionally, but preferably, in a single plane. The depth of draw can be in a range of about 0.125 inch to about 6 inches (about 3.1 mm to about 152.4 mm). In the fiberboard product, the depth of draw preferably is in the range of about 2 inches to about 3 inches (about 50.8 mm to about 76.2 mm). In the flakeboard or waferboard product, the depth of draw is preferably in the range of about 4 inches to about 6 inches (about 101.6 mm to about 152.4 mm).

The frequency of profile repeat (also referred to herein as rib width) can also be an important parameter for designing a component according to the invention. For example, preferred values for frequency of profile repeat in embodiments of the invention such as decking and pallet strip components will result in absorption of road vibration during shipment. The frequency of profile repeat can be defined as the linear distance from the center or midpoint of a first outer zone, past a first angled zone, the adjacent outer zone, and a second angled zone, to the center or midpoint of the next outer zone. Referring to FIG. 1B, for example, the profile repeat is generally u-shaped, and the frequency of profile repeat can be defined as the linear distance from the center of outer zone 11$e$, past outer zone 11$c$ and angled zones 12, to the center of outer zone 11$f$. Thus, in an article of the invention having a frequency of profile repeat of about two inches (about 50.8 mm), there will be about two linear inches (about 50.8 mm) from the center of zone 11$e$ to the center of zone 11$f$. The frequency of profile repeat is optionally, but preferably, uniform throughout an article of the invention.

The frequency of profile repeat preferably is in a range of about 2 inches to about 6 inches (about 50.8 mm to about 152.4 mm). In a fiberboard embodiment of the invention, the frequency of profile repeat preferably is in a range of about 2 inches to about 3 inches (about 50.8 mm to about 76.2 mm), most preferably about 2.5 inches (about 63.5 mm). In a flakeboard or waferboard embodiment of the invention, the frequency of profile repeat preferably is in a range of about 3 inches to about 6 inches (about 76.2 mm to about 152.4 mm), most preferably about 5 inches (about 127 mm).

Furthermore, in a flakeboard or waferboard embodiment of the invention, the frequency of profile repeat and wafer (or flake) length preferably are selected such that a wafer does not span the linear distance between two outer zones in such a manner that the wafer can be pinched and fractured during die closure. For example, if the frequency of profile repeat in FIG. 1B is four inches (101.6 mm) and the faces (i.e., the outermost portions or, in the board 8 as shown in the figure, the uppermost portions) of outer zones 11$a$ and 11$b$ are each 1.5 inches (38.1 mm) long, then the length of wafers used to make the board 8 preferably is 2.5 inches (63.5 mm), more preferably even less (i.e., the linear distance from the outer zone 11$a$ to the outer zone 11$b$, at most).

Figure 2A:
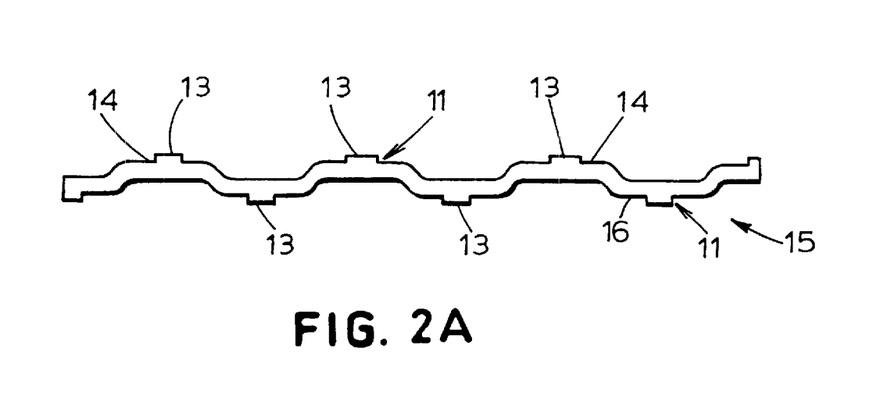
FIG. 2(a) is a cross-sectional view of a preferred embodiment of the ribbed board product produced according to the invention.
Figure 3A:
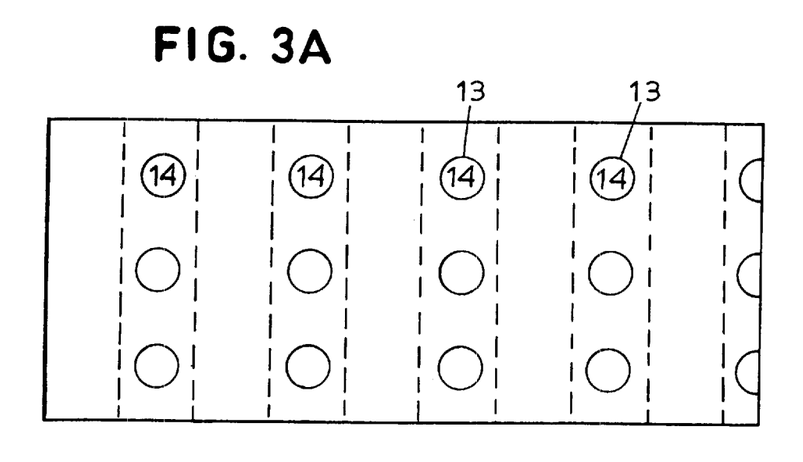
FIG. 3(a) is a top view of a die set used according to a preferred embodiment of the invention.

Referring to FIGS. 2($a$) and 3($a$), a board product 15 may also be produced with relatively low density areas or buttons 13 protruding from an upper surface or face 14 of the outer zones 11 of the rib profile. These low density buttons 13 preferably are debossed pads that extend about 0.030 inches to about 0.090 inches (about 0.76 mm to about 2.3 mm) (for example, about 0.060 inches or about 0.15 cm) upwardly from the top face 14 of the generally planar outer zones 11, and preferably are approximately 0.06 inches to 0.312 inches (about 1.5 mm to about 7.9 mm) in diameter, with about 0.093 inches to 0.125 inches (about 2.3 mm to about 3.2 mm) in diameter being preferred. The buttons 13 provide an integrated cushion for items placed on the ribbed hard density fiberboard, flakeboard, or waferboard. A typical application with the buttons may involve use of the product as drop-in sheets or slip sheets in corrugated box containers.

Figure 2B:
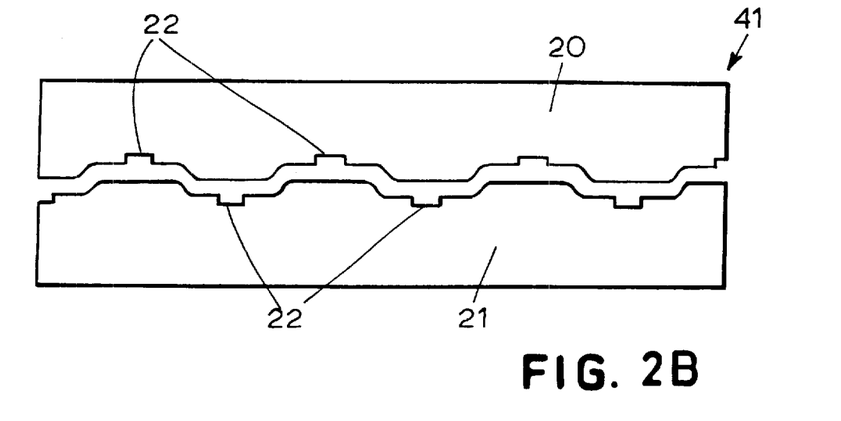
FIG. 2(b) is a cross-sectional view of a die set used according to a preferred embodiment of the invention.
Figure 3B:
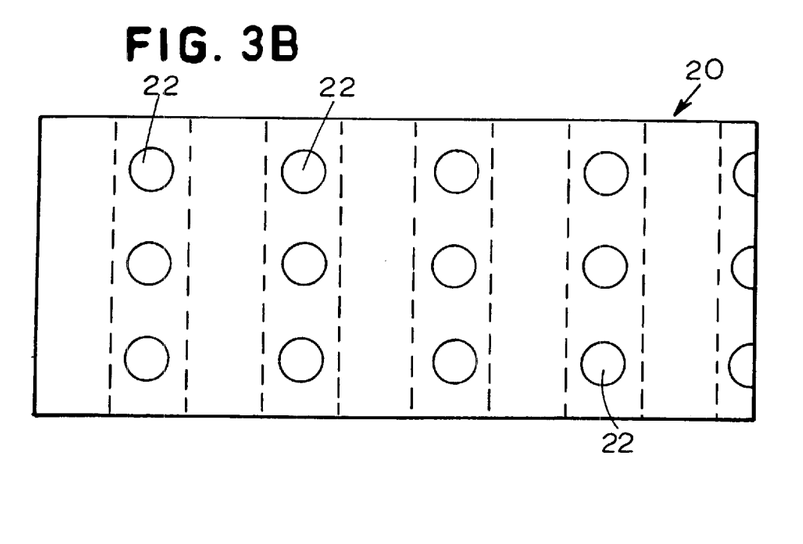
FIG. 3(b) is a top view of a preferred embodiment of a ribbed board product produced according to the invention.

FIG. 2($b$) shows a die set 41 for producing the product 15, including a first die 20 and a second die 21. Both the first die 20 and the second die 21 have cavities 22 along with a configuration for producing outer zones 11 and angled zones 12. FIG. 3($b$) shows a top view of the die 20 having the cavities 22. As described above, a mat is produced from wood fiber material and placed between the first die 20 and the second die 21. During the consolidation stage, this die configuration permits these lower density cavities 22 to create low density buttons 13 on the outer zones 11 of the ribbed high density fiberboard, as shown in FIGS. 2($b$) and 3($b$).

Figure 5:
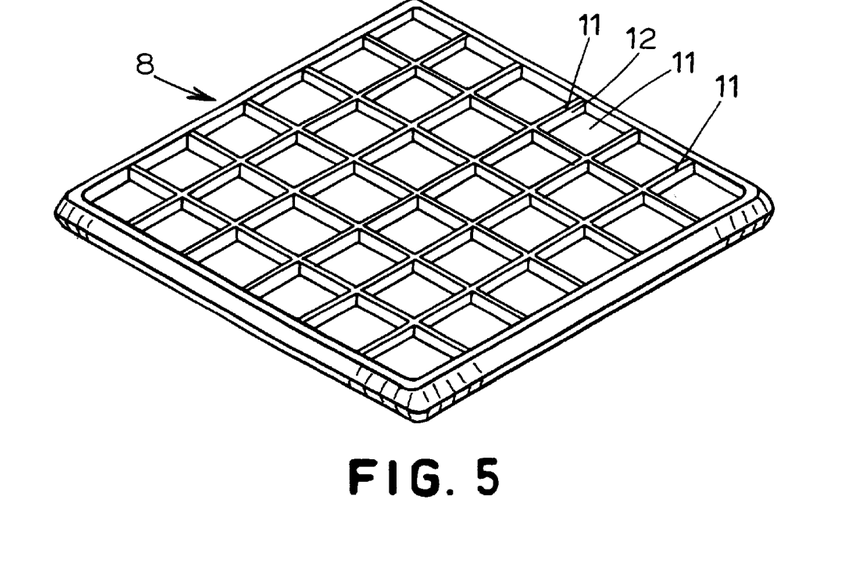
FIG. 5 is a perspective view of a waffle-shaped ribbed board product produced according to the invention.
Figure 6:
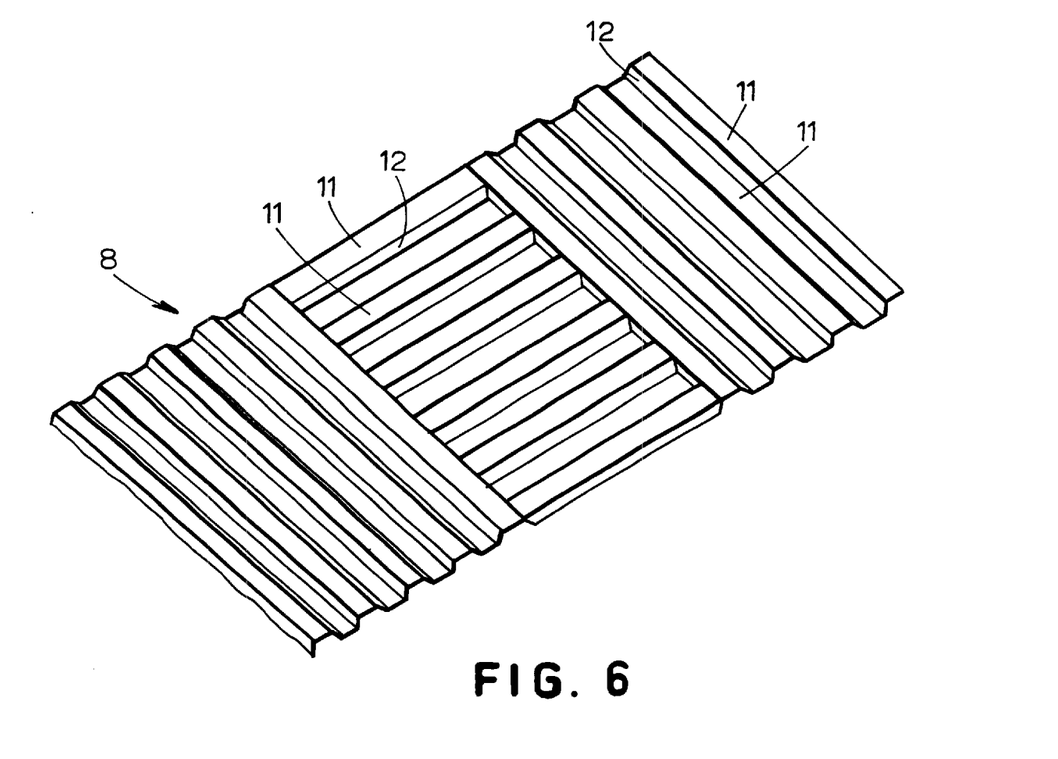
FIG. 6 is a perspective view of a multi-directional ribbed board product produced according to the invention.
Figure 7:
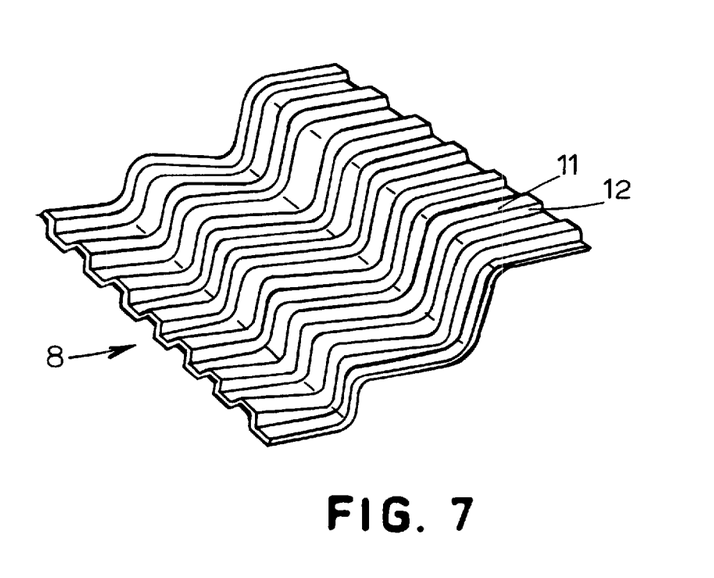
FIG. 7 is a perspective view of a ribbed board product produced according to the invention.

The geometries of the die and its product are not limited to a single ribbed configuration as shown in FIGS. 1–4. The die may further include repetitive pattern single and multiple direction ribbing to variable depths and draft angles. For example, the die set 40 may be configured to produce a chevron-shaped or waffle-shaped ribbed board, as shown in FIGS. 7 and 5, respectively, or the die set may be configured to produce multiple direction ribbing as shown in FIG. 6. Like elements from FIGS. 1–4 are shown with the same reference numerals in FIGS. 5–7. Another alternative approach includes laminating multiple plies of ribbed decks or strips together.

The ribbed boards of the invention provide unexpected results in a unique combination of properties in a single material, including a combination of cushioning characteristics and structural properties. The cushioning characteristics of the inventive boards provide increased ability to absorb high impact energy. The control of geometry with molded wood composites can provide three separate types of cushioning. First, as described above, there can be localized low density areas 13 on the outer side of the outer zones 11 of the rib profile. Further, compression from the deflection of the rib geometry itself can provide additional cushioning. Finally, there is also localized compression in the angled zone 12 of the profile caused by the above-described density gradient between the higher density outer zone 11 against the lower density angled zones 12 in the rib profile. This will be particularly desirable for products of a fragile nature. Specialty coatings can be applied to the surface of the ribbed panel to provide added performance such as fire protection.

The particular profile geometry produced according to this invention controls the density at specific locations in the outer zones 11 and angled zones 12 of the rib configuration. This not only maximizes its stiffness properties of the final product, but it also maintains the integrity of the wood composite during compression. A mat may be stretched as much as 30% or slightly more in an out-of-plane direction during pressing without fracturing occurring at the outer zones 12, whereas when conventional rib dies (having a uniform caliper) are used, the mat typically fractures when a stretching of 15% to 16% occurs.

Factors influencing the amount a mat can stretch during pressing with the invention include the size of the ribs or corrugations; the variation of density in the outer and angled zones of the final profiles after pressing; the bulk density and orientation of the composite materials such as oriented strand board (OSB) prior to press closure; and the fiber and flake geometry (including physical size, length, width and thickness of resource materials), which affect the ability of the composite material to shift or slide within the matrix of the mat before bypassing, fracturing or destroying the continuity of the composite mat during press closure. The process used and the unique die design used according to the invention help to manipulate these stretching factors so that the mat may stretch up to 30% without fracturing the mat at the outer zone 12.

Table 1 shows the compressive properties of the ribbed high density fiberboard made according to the invention. Maximum loads, maximum stress displacement at maximum load, and the percent strain at the maximum load were measured during compressive testing. These values depend on various factors including rib width, depth of draw, transition radius, severity of angle, the number of ribs per unit of width, and whether the ribs were restrained from the outer perimeter to the center of the sample. It was found that a rib width of about 1.179 inches (about 3 cm) allowed for a maximum load of 3301 pounds and a maximum stress of 188.5 psi. The displacement of the board at maximum load was 0.087 inches (2.2 mm), while the percent strain at maximum load was 24.2%.

TABLE 1

| Rib Width (in.) | Ribs per Sample | Re-strained | Rib Load Bearing Area (in.²) | Actual Load Bearing Sample Area (in.²) | Load at Max Load (lbs.) | Stress at Max Load (psi) | Rib Height (in.) | Displace at Max. Load (in.) | % Strain at Max. Load (%) |
|---|---|---|---|---|---|---|---|---|---|
| 1.179 | 1 | Yes | 3.588878 | 4.16 | 297.6 | 71.5 | 0.36 | 0.173 | 48.1 |
| 1.179 | 1 | Yes | 3.578265 | 3.89 | 311.6 | 80 | 0.36 | 0.158 | 43.9 |
| 1.179 | 1 | Yes | 3.585339 | 4.14 | 286.1 | 89.1 | 0.36 | 0.165 | 45.8 |
| 1.179 | 3 | No | 10.702962 | 10.65 | 858.2 | 80.5 | 0.36 | 0.052 | 14.4 |
| 1.179 | 3 | No | 10.593315 | 10.68 | 691.9 | 83.5 | 0.36 | 0.056 | 15.6 |
| 1.179 | 3 | No | 10.699425 | 10.74 | 685.6 | 63.9 | 0.36 | 0.046 | 12.8 |
| 1.179 | 3 | Yes | 8.93 | 9.13 | 1284 | 138.4 | 0.36 | 0.088 | 24.4 |
| 1.179 | 3 | Yes | 10.72 | 10.92 | 1610 | 147.5 | 0.36 | 0.103 | 28.6 |
| 1.179 | 3 | Yes | 9.08 | 9.32 | 1393 | 149.4 | 0.36 | 0.095 | 26.4 |
| 1.179 | 3 | Yes | 10.76 | 18.25 | 2152 | 117.9 | 0.36 | 0.082 | 22.8 |
| 1.179 | 3 | Yes | 10.65 | 17.66 | 1934 | 109.5 | 0.36 | 0.085 | 23.6 |
| 1.179 | 3 | Yes | 10.98 | 17.35 | 2149 | 123.9 | 0.36 | 0.076 | 21.1 |
| 1.179 | 5 | No | 17.950275 | 17.94 | 1318 | 73.5 | 0.36 | 0.048 | 13.3 |
| 1.179 | 5 | No | 17.93259 | 18.16 | 1894 | 104.3 | 0.36 | 0.05 | 13.9 |
| 1.179 | 5 | No | 17.808795 | 18.03 | 1753 | 97.2 | 0.36 | 0.059 | 16.4 |
| 1.179 | 5 | Yes | 17.43 | 17.71 | 2873 | 162.3 | 0.36 | 0.089 | 24.7 |
| 1.179 | 5 | Yes | 17.31 | 17.51 | 3301 | 188.5 | 0.36 | 0.087 | 24.2 |
| 1.197 | 3 | Yes | 10.59 | 11.34 | 1362 | 120.1 | 0.375 | 0.084 | 22.4 |
| 1.197 | 3 | Yes | 10.81 | 11.97 | 1204 | 100.6 | 0.375 | 0.082 | 21.9 |
| 1.197 | 3 | Yes | 10.69 | 11.36 | 1327 | 116.9 | 0.375 | 0.099 | 26.4 |
| 1.197 | 3 | Yes | 10.83 | 11.62 | 1513 | 130.2 | 0.375 | 0.066 | 22.9 |
| 1.197 | 3 | Yes | 10.83 | 11.52 | 1549 | 134.5 | 0.375 | 0.089 | 23.7 |
| 1.375 | 3 | Yes | 12.16 | 12.84 | 1536 | 119.6 | 0.391 | 0.099 | 25.3 |
| 1.375 | 3 | Yes | 12.21 | 12.51 | 1154 | 92.2 | 0.391 | 0.09 | 23 |
| 1.375 | 3 | Yes | 12.19 | 12.53 | 1596 | 127.3 | 0.391 | 0.087 | 22.3 |
| 1.375 | 3 | Yes | 12.27 | 12.54 | 1379 | 110 | 0.391 | 0.102 | 26.1 |
| 1.375 | 3 | Yes | 12.37 | 12.62 | 1129 | 89.4 | 0.391 | 0.096 | 24.6 |
| 1.25 | 3 | Yes | 11.01 | 11.76 | 1439 | 122.4 | 0.391 | 0.121 | 30.9 |
| 1.25 | 3 | Yes | 11.25 | 11.98 | 1312 | 109.6 | 0.391 | 0.089 | 22.8 |
| 1.25 | 3 | Yes | 11.31 | 11.91 | 1335 | 112.1 | 0.391 | 0.098 | 25.1 |
| 1.25 | 3 | Yes | 11.10 | 11.77 | 1084 | 92.1 | 0.391 | 0.092 | 23.5 |
| 1.25 | 3 | Yes | 11.18 | 11.79 | 1232 | 104.5 | 0.391 | 0.096 | 24.6 |

Table 2 shows the stiffness properties of the ribbed board of the invention. Six samples of the invention, all measuring 6 inches in width and spanning 10 inches in length were subjected to testing to determine various strength properties. The results are shown in Table 2 below.

TABLE 2

| Rib Width (in.) | Rib Height (in.) | Modulus of Rupture (psi) | Modulus of Elasticity × 1000 psi | Span (in.) | Stiffness (lb.-in.^2) | Break Load (lbs.) | Stiffness/ Sample Width (lb.-in.) | Sample Width (in.) | Ribs per Sample |
|---|---|---|---|---|---|---|---|---|---|
| 1.179 | 0.36 | 1667 | 161 | 10 | 3754 | 86.4 | 626 | 6 | 5 |
| 1.179 | 0.36 | 1929 | 190 | 10 | 4411 | 100 | 735 | 6 | 5 |
| 1.179 | 0.36 | 2226 | 201 | 10 | 4658 | 115.4 | 776 | 6 | 5 |
| 1.25 | 0.391 | 1800 | 171 | 10 | 5041 | 110.1 | 840 | 6 | 5 |
| 1.25 | 0.391 | 1810 | 175 | 10 | 5137 | 110.7 | 856 | 6 | 5 |
| 1.25 | 0.391 | 1802 | 180 | 10 | 5282 | 110.2 | 880 | 6 | 5 |

Table 3 shows a comparison of the average stiffness of board produced according to the invention with different rib widths to the average stiffness of ¼ inch (6.35 mm) thick high density fiberboard.

TABLE 3

| Description | Average Stiffness/Sample Width (lb.-in.) |
|---|---|
| 1/4" High Density Fiberboard | 593.583 |
| Rib Width of 1.179 in. | 712.333 |
| Rib Width of 1.25 in. | 858.667 |

FIBERBOARD EXAMPLE

A fiberboard panel according to the invention measuring about 18 inches (about 45.7 cm) square was produced. The panel caliper was about 0.112 inch (about 2.84 mm) at the outer zones and about 0.125 inch (about 3.18 mm) at the angled zones. The depth of draw was about 0.312 inch (about 7.92 mm), the panel thickness was about 0.425 inch (about 10.8 mm) the width of each outer zone was about 0.838 inch (about 21.3 mm), and the rib width was about 2.5 inches (about 63.5 mm). Initial testing indicated that the panel was stiffer than the panels described in Table 3.

In addition to improved strength and stiffness properties, another advantage of a ribbed board produced according to the invention is that the upper and lower surfaces 14 of the ribbed hardboard (the outer surface of outer zones 11) may provide a uniform plane with consistent texture or smoothness, unlike natural wood which typically has knots, splits, and/or cracks due to the prevalent use of "green" high moisture lumber. Because of this uniform plane, there is an equal weight distribution of any product placed on the ribbed high density fiberboard or flakeboard, for example. Thus, the ribbed high density products of the invention are less likely to fracture or cause damage from localized pressure points. Conversely, when a load is placed on a non-consistent surface such as natural wood, pressure points develop creating stress and possibly fractures on the pallet material as well as materials being shipped on the pallet.

The surfaces 11, 14, or 16 may also be tempered and/or textured to add hardness or glueability to these surfaces. Further, the molded rib panels may be laminated together or with alternate materials to achieve low weight components for higher stiffness and compressive properties, for example, in pallets and shipping applications.

This process according to the invention produces a single component material that integrates an engineered combination of various desired useful properties, such as compressive strength, stiffness, impact deflection, variable shock absorption, an increased water repellency over corrugated paper, and surface friction when steel die surface is textured. These properties in combination are unique to fiberboard and flakeboard because within the described process of low resin usage, the furnish does not flow during pressing formation, thus creating the variable density which generates controllable physical properties of stiffness and/or compressive attributes in a single component. This change in density also facilitates breathing of steam inherent in the process at higher than normal density zone as defined by the rib profile caliper changes. This feature differs from other wood composite pallets which use higher resin and wood particles to achieve uniform density throughout their products.

Figure 8:
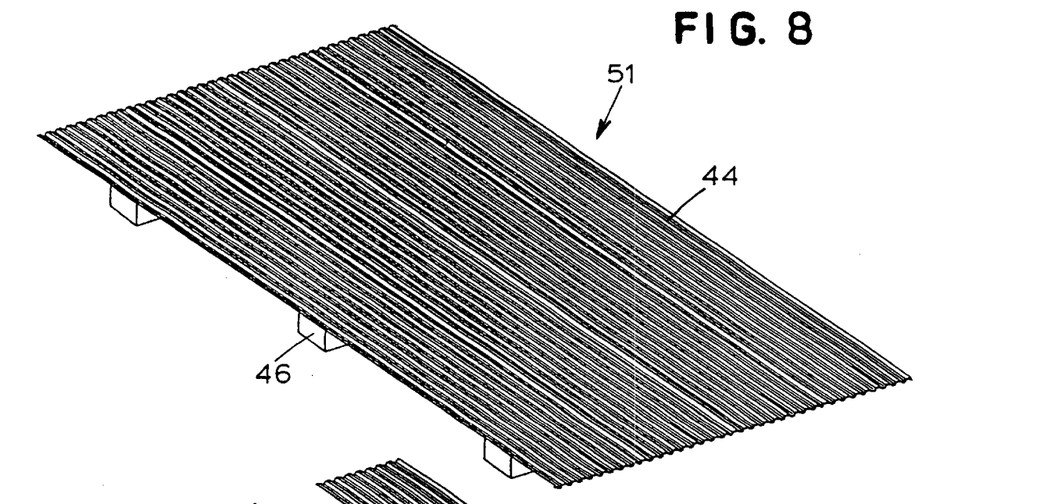
FIG. 8 is a perspective view of a pallet including a ribbed board product produced according to the invention.
Figure 9:
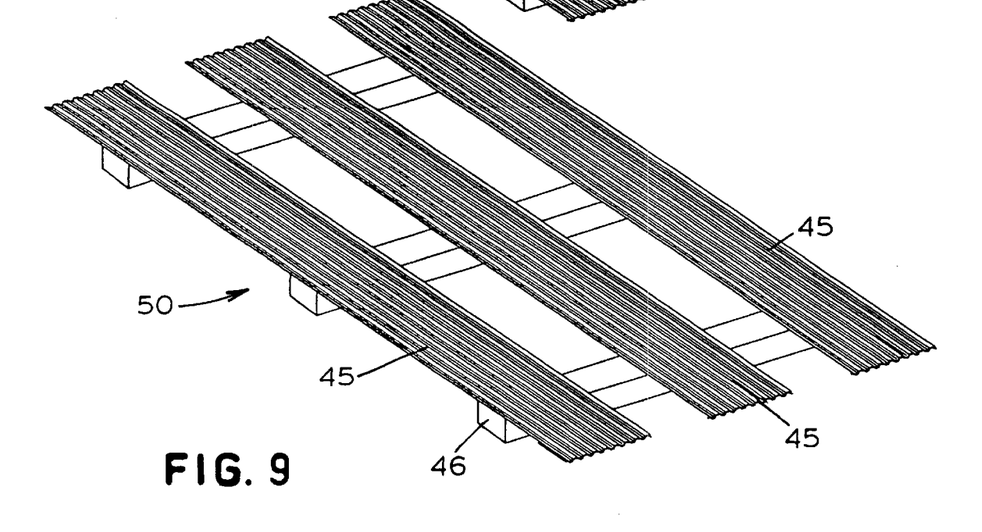
FIG. 9 is a perspective view of a pallet including a ribbed board product produced according to the invention.

Through the manipulation of die geometry, a balance between compressive strength, cushioning properties, and flexural stiffness is achieved. Fiberboard, flakeboard, and waferboard articles produced according to the invention are excellent materials for use in components such as decks and strips for shipping and storage. FIGS. 7 and 8 illustrate pallets 50 and 51 produced from the inventive hardboard/flakeboard material. A deck 44 (FIG. 7) or strips 45 (FIG. 8) cut from this ribbed high density fiberboard/flakeboard are fastened to support runners 46 by known methods including staples, nails, and adhesives. The support runners 46 may be made from wood composite materials, or low grade aspen or oak lumber that is not kiln dried. Further, paper, flat hardboard (for example, a commercial lightweight laminate panel produced by Masonite Corp.) or other flat sheet materials can be laminated (not shown) and may be used on the pallet deck to stiffen the component on one or both sides of the ribbed panel.

Products made according to this invention such as packaging components or pallets exhibit many improved attributes. First, the invention allows for control of the surface density of the pallet. A panel that is more dimensionally stable versus "green" lumber with higher moisture content and provides an improved planar surface than whole wood lumber is preferably utilized, which provides a uniform medium for nails and staple penetration and jacking resistance. Second, the product possesses significantly higher compression strength and stiffness than corrugated paperboard. Third, the invention can provide a product with sufficient surface friction to avoid slippage of materials placed thereon. Fourth, the pallets also provide cushioning that absorbs live load impact shock. Fifth, the design also provides resistance to damage caused by fork lifts or other machinery used to move the pallets. This design prevents full deck failure by limiting damage to a localized edge, sacrificing one or two ribs (e.g., though failure at one or two angled zones). Sixth, a deck made from the inventive material itself is a conveyable material, which provides a slip-sheet or carrier for products during in-house operations, and a separator sheet for products being warehoused. Seventh, the product is environmentally friendly and can be ground up and easily disposed of or reused, unlike plastics and foams that often involve landfilling. Eighth, the product panel is lightweight relative to whole lumber products, and nests or stacks in less space, assembles easily and results in a consistent, high yield usage in field application. Finally, the inherent nature of the ribbed profile ribbing design allows nails and/or fasteners and/or fastener heads, protrusions, etc., to be recessed below an upper plane of the ribs.

The foregoing description is given for clearness of understanding only, and no unnecessary limitations should be understood therefrom, as modifications within the scope of the invention will be apparent to those skilled in the art.

What is claimed is:

1. A ribbed wood composite board product, comprising:
at least two longitudinally extending outer zones having a first caliper;
at least one longitudinally extending angled zone having a second caliper, said angled zone disposed between and contiguous with said outer zones, and the ratio of the first caliper to the second caliper is less than 0.9, and the density of said angled zone is less than the density of said outer zones, and said at least two longitudinally extending outer zones and said at least one longitudinally extending angled zone extend the entire length of said board.

2. A ribbed wood composite board product, comprising:
at least two longitudinally extending outer zones having a first caliper;
at least one longitudinally extending angled zone having a second caliper, said angled zone disposed between and contiguous with said outer zones, and the ratio of the first caliper to the second caliper is less than 0.9, and the density of said angled zone is less than the density of said outer zones; and
a contiguous plurality of ribs, each rib comprising first, second, and third longitudinally extending outer zones having a first caliper, and first and second longitudinally extending angled zones having a second caliper, said first angled zone disposed between and contiguous with said first and second outer zones, said second angled zone disposed between and contiguous with said second and third outer zones, wherein a distance between adjacent outer zones is in a range of about 2 inches to about 6 inches, and said outer zones and said angled zones extend the entire length of said board.

* * * * *